United States Patent [19]

Squires et al.

[11] Patent Number: 4,622,499
[45] Date of Patent: Nov. 11, 1986

[54] METHOD AND APPARATUS FOR CONTROLLING A MOTOR

[75] Inventors: John P. Squires, Jamestown; Alan D. Kronisch; John J. Freeman, both of Longmont; James J. Touchton, Boulder, all of Colo.

[73] Assignee: MiniScribe Corporation, Longmont, Colo.

[21] Appl. No.: 706,147

[22] Filed: Feb. 27, 1985

[51] Int. Cl.[4] .............................................. H02P 6/02
[52] U.S. Cl. .................................... 318/254; 318/138; 318/269; 318/439
[58] Field of Search .................. 318/138, 254 A, 254, 318/313, 314, 439, 269, 696

[56] References Cited

U.S. PATENT DOCUMENTS

| | | | |
|---|---|---|---|
| 3,806,786 | 4/1974 | Inaba | 318/314 |
| 3,873,900 | 3/1975 | Sommer et al. | 318/314 |
| 4,061,950 | 12/1977 | Kayanuma | 318/314 |
| 4,078,192 | 3/1978 | Fultz | 318/314 X |
| 4,123,779 | 10/1978 | Goldschmidt | 318/314 X |
| 4,153,863 | 5/1979 | Schachte et al. | 318/341 |
| 4,223,261 | 9/1980 | White | 318/314 X |
| 4,270,074 | 5/1981 | Duckworth et al. | 318/254 |
| 4,271,383 | 6/1981 | Endo | 318/375 |
| 4,280,082 | 7/1981 | Acharya et al. | 318/341 |
| 4,287,458 | 9/1981 | Nakamura et al. | 318/341 |
| 4,301,395 | 11/1981 | Furuhata et al. | 318/314 |
| 4,319,171 | 3/1982 | Motoori | 318/379 |
| 4,360,767 | 11/1982 | Akiyama et al. | 318/318 |
| 4,371,819 | 2/1983 | Kaufmann | 318/341 |
| 4,374,352 | 2/1983 | Webster | 318/375 X |
| 4,392,094 | 7/1983 | Kuhnlein | 318/254 |
| 4,409,527 | 10/1983 | Sommeria | 318/341 |
| 4,472,666 | 9/1984 | Akeda et al. | 318/439 X |
| 4,494,051 | 1/1985 | Bailey | 218/254 |
| 4,494,052 | 1/1985 | Kelleher et al. | 318/254 |
| 4,507,591 | 3/1985 | Kelleher | 318/138 X |
| 4,525,657 | 6/1985 | Nakase et al. | 318/313 X |
| 4,528,486 | 7/1985 | Flaig et al. | 318/254 |
| 4,535,405 | 8/1985 | Hill et al. | 318/254 X |

FOREIGN PATENT DOCUMENTS

| | | | |
|---|---|---|---|
| 0129327 | 12/1984 | European Pat. Off. | |
| 58-3596 | 1/1983 | Japan | 318/254 |
| 59-156196 | 9/1984 | Japan | 318/696 |
| 59-181996 | 10/1984 | Japan | 318/696 |

*Primary Examiner*—William M. Shoop, Jr.
*Assistant Examiner*—Bentsu Ro
*Attorney, Agent, or Firm*—Curtis, Morris & Safford

[57] ABSTRACT

An n-phase DC motor is controlled by converting a motor speed command signal generated from a programmed CPU to a motor drive signal and using this motor drive signal to apply DC power to a selected phase of the motor, the amount of applied DC power being a function of the value of the motor speed command signal. Signals representing the position and/or speed of the motor are supplied to the CPU from which the CPU detects speed errors. The speed command signal then is modified to speed up or slow down the motor so as to reduce the detected errors.

33 Claims, 13 Drawing Figures

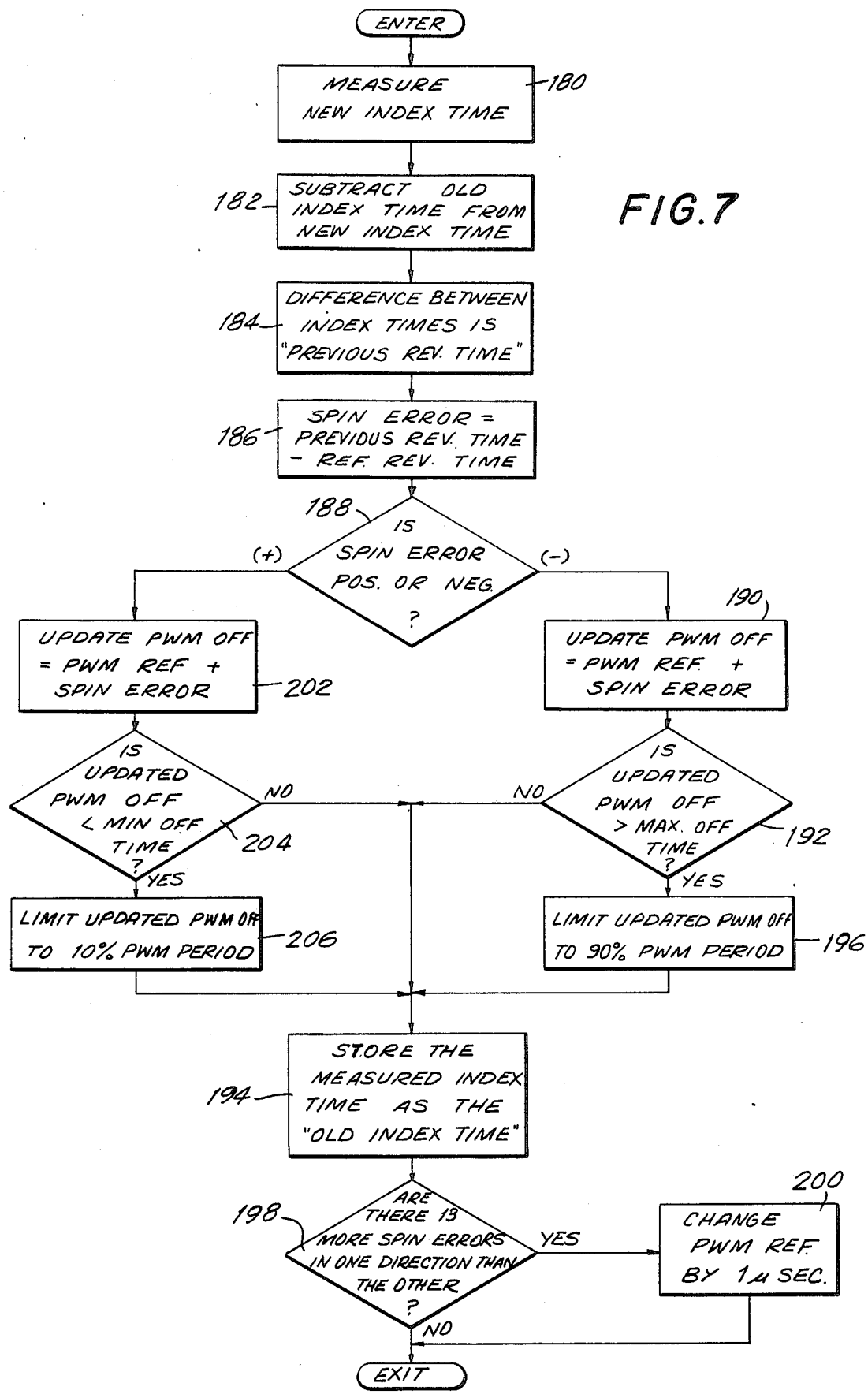

METHOD AND APPARATUS FOR CONTROLLING A MOTOR

BACKGROUND OF THE INVENTION

This invention relates to techniques for controlling a motor and, more particularly, to a method and apparatus for driving and controlling a motor. Although the present invention is applicable to both AC and DC motors, the embodiments described herein are disclosed in the context of driving and controlling the speed of a DC motor. Furthermore, the motor which is controlled by the present invention is particularly useful in those applications requiring relatively precise and accurate motor speeds, one of which applications is to drive a magnetic disk on which data is written and read. Such a motor is known, typically, as a "spin motor", and the present invention advantageously is used to drive the spin motor of a small disk drive device, such as a 5¼ inch or a 3½ inch (or smaller) disk drive. Other applications and uses of the controlled motor are contemplated, as will become apparent.

In typical motor drive systems, either for AC motors or DC motors, solid-state control circuitry, such as transistor circuitry, is connected to a conventional motor, and control signals are applied to the transistor circuitry to determine and regulate the current flowing through that motor. In applications requiring motor speed control, the actual speed of the motor is represented by suitable signals, which may be generated either as a function of the actual motor current or as a function of the rotation of a reference point on the motor past a suitable pick-up. These signals are used to detect errors or departures from a desired motor speed. Such detected errors then are fed back to vary the operation of the transistor circuitry so as to maintain proper speed control over the motor.

In one motor control circuit, the duty cycle of a pulse width modulated (PWM) signal is controlled by a digital counter, the PWM signal being used to set the speed of the motor. A digital processor is supplied with encoder pulses generated by, for example, a Hall effect sensor to represent the actual speed of the controlled motor. The processor determines speed errors as a function of these encoder pulses to shorten or lengthen the duty cycle of the PWM signal, thereby adjusting the motor speed. In another technique, the PWM signal that is used to drive the motor is integrated to supply a slowly changing drive signal to the motor.

One difficulty that has been recognized in systems which adjust the motor drive signal promptly in response to speed errors is the sensitivity of the motor control circuit to repetitive errors. Even though such speed errors may be relatively small, this sensitivity may result in sudden or jerky changes in the motor speed. Techniques have been suggested to enhance the overall speed of loop stability of such circuits, such as utilizing phase-locked loops, integrators, and the like.

Another problem attending motor speed control systems relates to the stopping or braking of the controlled motor. If the drive signal is interrupted, such as if the duty cycle of the PWM signal is reduced to zero, the motor eventually will coast to a stop. However, in various applications, such as in small disk drives, it is desirable for the motor to be braked quickly. Dynamic braking of a DC motor has been proposed, wherein the bipolar transistor drive elements which are connected across the motor windings are simultaneously rendered conductive to form a closed loop which short-circuits the motor. It is difficult, however, in controlling DC motors, to achieve such dynamic braking when the usual motor power supply (which supplies operating power to both the motor and the control circuitry) is cut off. Also, the circuit components that have been used generally are quite large or bulky, and dissipate significant amounts of power.

OBJECTS OF THE INVENTION

Therefore, it is an object of the present invention to provide an improved method and apparatus for controlling the speed of a motor.

Another object of this invention is to provide a method and apparatus for driving a motor which overcomes many problems attending prior art techniques, some of which have been addressed above.

A further object of this invention is to provide a method and apparatus for driving an n-phase DC motor, whereby a desired speed of that motor is maintained.

An additional object of this invention is to provide a method and apparatus for driving a DC motor wherein relatively long-term errors as well as short-term speed errors are compensated.

Another object of this invention is to utilize a central processing unit (CPU) to generate motor command signals for controlling the speed of a DC motor, these signals being varied as a function of speed errors that are sensed by the CPU.

A still further object of this invention is to utilize a CPU in controlling a DC motor wherein the speed of that motor is brought rapidly to a desired operating speed from a start, or still, position.

An additional object of this invention is to provide a method and apparatus for braking a DC motor to a stop in the event that power thereto is cut off.

Another object is to utilize FET elements in the motor drive and brake circuitry.

A specific object of this invention is to provide a method and apparatus for controlling an n-phase DC motor that is used as a spin motor in a disk-drive system, such as in a small Winchester disk system.

Various other objects, advantages and features of the present invention will become readily apparent from the ensuing detailed description, and the novel features will be particularly pointed out in the appended claims.

SUMMARY OF THE INVENTION

In its broader sense, the present invention is concerned with a method and apparatus for driving a motor such that the motor speed is accurately controlled. Although the motor preferably is a rotary DC motor, the teachings of the present invention are applicable to driving and controlling the speed of a linear DC motor, a linear AC motor or a rotary AC motor.

In the context of driving and controlling an n-phase DC motor, motor speed command signals are generated by a central processing unit (CPU) in accordance with a programmed set of instructions. The motor speed command signal may be a pulse width modulated (PWM) signal or a digital signal having a value (e.g. a numerical value) representing a commanded motor speed. The motor speed command signal is converted to a motor drive signal, as by integrating the PWM signal or by digital-to-analog conversion of the digital signal, and the motor drive signal is used to apply DC power to a selected phase of the DC motor. The amount of DC power which is applied is a function of the magnitude of the motor drive signal which, in turn, is determined by the motor speed command signal. Signals representing the position and/or speed of the motor are supplied to the CPU, these supplied signals being used by the CPU to detect errors in the actual motor speed. The CPU then modifies the motor speed command signal by an amount and in a direction which tends to reduce the detected speed errors.

In one embodiment, the signals representing motor position and/or speed are index pulses which are generated as the motor moves past one or more index positions, the time separation of these index pulses being a function of the speed of the motor. An index time related to the time separation of the index pulses is compared to a preceding index time and the difference therebetween is compared to a reference time value to provide an indication of speed error.

As one feature, the CPU is programmed to combine a reference speed value with a detected speed error to produce the motor speed command signal. If the number of detected speed errors in one direction exceeds the number of detected speed errors in the opposite direction by a preset amount, the reference speed value is changed. For instance, if the number of slow speed errors exceeds the number of fast speed errors by this preset amount, the reference speed value is increased to command a speed-up of the motor. As an example, the reference speed value may be changed by a predetermined increment.

In accordance with another feature, each phase, or winding, of the motor is coupled to a respective switching device, such as a transistor (e.g. a MOSFET), and commutation pulses are supplied to these switching devices one-at-a-time. The commutation pulses may be derived directly from a commutation pulse generator that is coupled to the motor or, alternatively, the commutation pulses may be produced by the CPU in response to the index pulses.

In accordance with a further feature, a signal representing the actual motor current is fed back and negatively combined with the motor drive signal, the result of this combination being supplied to the switching devices to determine the motor current.

A still further feature is to store a DC voltage level when power is supplied to the motor and to the motor drive circuitry, and to use the stored DC voltage level to turn on the switching devices so as to short-circuit all of the n phases of the motor when power is cut off.

As yet another feature, the CPU is programmed to sense whether successive signals representing the rotary position and/or speed of the motor have been generated within a predetermined time period, to sense whether the motor has reached a predetermined speed within a preset number of revolutions, and to sense whether the motor has maintained its speed for a predetermined number of revolutions. If any of these conditions have not been met, the CPU deenergizes the motor. This facilitates prompt and accurate start-up of the motor and, if this programmed routine is carried out during normal operation, maintains the motor at its proper speed, subject to the speed control operation mentioned above.

BRIEF DESCRIPTION OF THE DRAWINGS

The following detailed description, given by way of example, and not intended to limit the present invention solely to the preferred embodiments disclosed and shown herein, will best be understood in conjunction with the accompanying drawings in which:

FIG. 7 is a flow chart of a motor control routine that is used with this invention.

DETAILED DESCRIPTION OF CERTAIN PREFERRED EMBODIMENTS

Figure 1:
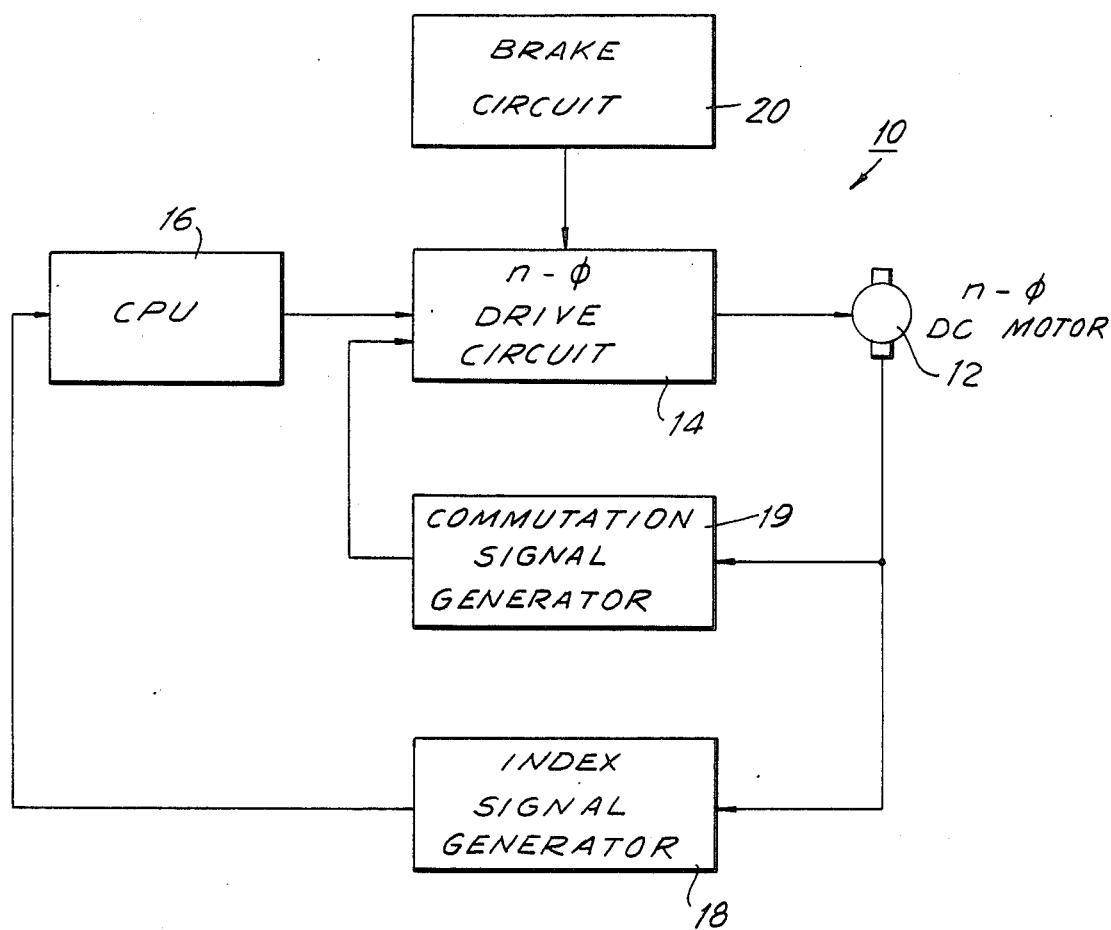
FIG. 1 is a block diagram of a motor speed control system in accordance with the present invention.

Referring now to the drawings, and in particular to FIG. 1, there is illustrated a block diagram of a motor speed control system 10 incorporating the present invention. As illustrated in block form, the motor speed control system is useable with a motor 12 and includes a motor drive circuit 14, a central processing unit (CPU) 16, an index signal generator 18 and a commutation signal generator 19. In the embodiment described herein, motor 12 is an n-phase DC motor, such as a 2-phase or 3-phase motor. However, as will be appreciated from the description set out below, motor 12 may comprise an AC motor and motor drive circuit 14 may be compatible with that AC motor. However, to facilitate a ready understanding of the broad teachings of this invention, motor 12 will be described as an n-phase DC motor.

Motor drive circuit 14 is coupled to motor 12 and, as will be described in greater detail below with respect to the embodiments shown in FIGS. 2 and 3, drive circuit 14 includes a number of separately actuable switching devices, each being coupled to a respective phase, or winding, of motor 12. For example, if motor 12 is a 2-phase DC motor, drive circuit 14 is provided with two switching devices, each being coupled to a respective phase, or winding, of the motor. Similarly, if motor 12 is a 3-phase DC motor, drive circuit 14 likewise is provided with three switching devices, each being separately coupled to a respective one of the motor phase windings.

Drive circuit 14 is coupled to CPU 16 which, in a preferred embodiment, may comprise a conventional microprocessor that is programmed to carry out the instructions described below. As an alternative, CPU 16 may be constructed of discrete circuit components, such as logic circuits, and may be formed of separately wired circuit components or of a large scale integrated (LSI) circuit. To facilitate a ready understanding of the present invention, CPU 16 is described as a programmed processor having the usual read only memory (ROM), random access memory (RAM), timing modules and other conventional peripheral devices normally provided with microprocessors. Since the microprocessor art is well known to those of ordinary skill, further description of its construction and components need not be provided. Nevertheless, it will be understood that typical microprocessors manufactured by Intel, Motorola, Zylog and other semiconductor manufacturers may be used, if desired.

CPU 16 is adapted to generate a motor speed command signal which is supplied to drive circuit 14 and is used by the drive circuit to energize motor 12 in a manner whereby the desired speed of the motor is achieved and maintained. The manner in which the motor speed command signal is generated and the manner in which this signal is used by drive circuit 14 will be described below.

Index signal generator 18 is coupled to CPU 16 and is adapted to supply index signals to the CPU, these index signals representing the position and/or speed of motor 12. As an example, index signal generator 18 may comprise a pulse position generator which is adapted to sense when one or more respective phases of motor 12 rotates past a reference position. One embodiment of such a pulse position generator is a so-called Hall effect sensor which may be fixedly positioned at a reference location and is adapted to generate a pulse when a ferromagnetic element mounted on the rotary shaft of motor 12 rotates therepast. In one example, a single Hall sensor, or pick-up, is provided and the rotary shaft of motor 12 may have coupled thereto a plurality of ferromagnetic elements equally spaced at desired angular locations. As an example, two such elements may be spaced 180° apart so as to generate two rectangular waves as the motor undergoes one complete revolution. As another example, three such ferromagnetic elements may be spaced 120° apart. As yet another example, one or more ferromagnetic elements may be associated with each phase of motor 12 such that, for a 3-phase motor, one pulse is generated when the first phase rotates to the reference position, another pulse is generated when the second phase rotates to that reference position and a third pulse is generated when the third phase rotates to that reference position. As still another example, each phase of the motor may be associated with two such ferromagnetic elements, whereby two pulses are generated for each phase as the motor rotates by 360°.

In the foregoing, it has been assumed that a single Hall sensor is used to generate the index pulses. While this may be satisfactory for a 2-phase motor, it is preferable to provide a respective Hall sensor for each phase if the number of phases of motor 12 is three or more.

The index signals generated by index signal generator 18 are supplied to CPU 16 for the purpose of detecting the actual speed of the motor. For example, if the index signal generator is operable to generate uniformly spaced pulses when motor 12 operates at a fixed speed, then the time separation between two successive index pulses is an indication of the actual speed of the motor. Of course, it will be appreciated that, if desired, the time separation between any two index pulses, such as the first and third pulses, the first and fourth pulses, etc., may be used to represent the actual motor speed. Based upon the detected motor speed, as derived from these index pulses, CPU 16 is adapted to determine whether a speed error is present, that is, whether the actual motor speed differs from the desired, or programmed motor speed, whereupon the motor speed command signal is modified to correct such error. Hence, the motor speed command signal may be increased if CPU 16 senses that motor 12 is operating too slowly, or the motor speed command signal may be reduced if the CPU senses that the motor is operating too rapidly. The manner in which the motor speed error is detected and the motor speed command signal is modified is described in greater detail below.

In addition to supplying the motor speed command signal to motor drive circuit 14, CPU 16 is adapted, in one embodiment to supply commutating pulses to the motor drive circuit. These commutating pulses are used to select the appropriate phase of motor 12 which is to be energized. Such commutating pulses may be produced by the CPU from the index signals supplied by index signal generator 18. Thus, CPU 16 utilizes the index signals for two purposes, viz. to determine and compensate motor speed errors, and to select the appropriate phase of the motor which is to be energized.

As an alternative embodiment, a commutation signal generator 19, similar to index signal generator 18, may generate commutation signals that are supplied directly to motor drive circuit 14 as the commutation pulses therefor.

Motor speed control system 10 also is provided with a brake circuit 20 coupled to motor drive circuit 14. The brake circuit is adapted to achieve dynamic braking of motor 12 in the event that the electrical power supply to the motor and to the motor drive circuit is cut off. As will be described below, DC power is supplied by way of a conventional DC power supply, the latter including a voltage regulator for supplying regulated voltage to elements of the motor drive circuit. Brake circuit 20 includes a storage device, such as a capacitor, supplied with voltage from the power supply and adapted to store a voltage level during normal operation of the motor and motor drive circuit. When the power supply is cut off, either intentionally or inadvertently, the stored voltage level is supplied to drive circuit 14 to effect a short-circuiting of the phases of motor 12. This short-circuiting is achieved by providing a low impedance path from all of the motor windings to a reference potential, such as ground, thereby resulting in rapid, dynamic braking of the motor.

The manner in which motor speed control system 10 operates now will be briefly described. Let it be assumed that the usual power supply is operating so as to supply energizing power to drive circuit 14. Let it also be assumed that suitable energizing potential is applied to CPU 16. For the purpose of the present description, it will be assumed that each of the n phases of motor 12 is coupled in common to the power supply. The function of drive circuit 14 is to select the appropriate one of these phases to be energized and also to determine the current level which flows through the energized phase. When power first is applied, or turned on, CPU 16 executes a start up routine, described below with respect to FIGS. 6A and 6B. As a result of this start up routine, the CPU supplies a motor command signal to motor drive circuit 14 to effect a rapid start-up of motor 12 to its desired operating speed. As an example, the operating speed of motor 12 is on the order of about 3600 rpm. During the start up routine, index generator 18 supplies index signals to the CPU representing the actual speed of the motor. These signals, and more particularly, the time separation therebetween, are used by the CPU to determine whether the motor has reached its operating speed within preset parameters (e.g. within a predetermined number of revolutions of the motor) and whether that speed has been maintained for a desired period of time. Assuming that motor 12 has reached its operating speed properly, the microprocessor then executes its motor control routine by which the speed of the motor is maintained.

When operating to maintain motor 12 at its operating speed, motor drive circuit 14 is controlled by the commutation pulses supplied thereto by CPU or, in the alternative embodiment, by the commutation pulses supplied directly by commutation signal generator 19, to select, or actuate, desired ones of the motor phases. As an example, each of the n phases of motor 12 are selected, or actuated, in succession. It will be appreciated that, in the preferred embodiment, only one phase of the motor is selected, or actuated, at any given time.

As motor 12 rotates, index signal generator 18 continues to generate index signals representing the position and speed of the motor, these index signals being used by CPU 16 to detect speed errors. More specifically, deviations between the actual speed of motor 12 and the desired, operating speed thereof are sensed. If the motor operates too slowly, the speed command signal is changed (e.g. it is increased) by CPU 16, resulting in an increase in the current flowing through the selected, or actuated, phase so as to increase the motor speed. Conversely, if the motor operates too rapidly, CPU 16 changes the speed command signal in an opposite direction (e.g. it is decreased), whereupon motor drive circuit 14 causes a reduced current to flow through the selected, or actuated motor phase.

Let it now be assumed that the power supply which energizes the motor and the motor drive circuit is interrupted. The voltage level which had been stored on the storage device of brake circuit 20 is utilized by motor drive circuit 14 to connect simultaneously all of the phases of motor 12 to ground. Hence, as the motor rotates due to inertia following the interruption of the power supply, reverse currents are induced in the motor windings thus dynamically braking the motor.

In the foregoing description, it has been assumed that motor 12 is a rotary motor. It will be readily appreciated that, if desired, the motor may comprise a linear motor wherein a linearly movable armature is driven by motor drive circuit 14 rather than a rotary driven armature (or rotor).

Figure 2:
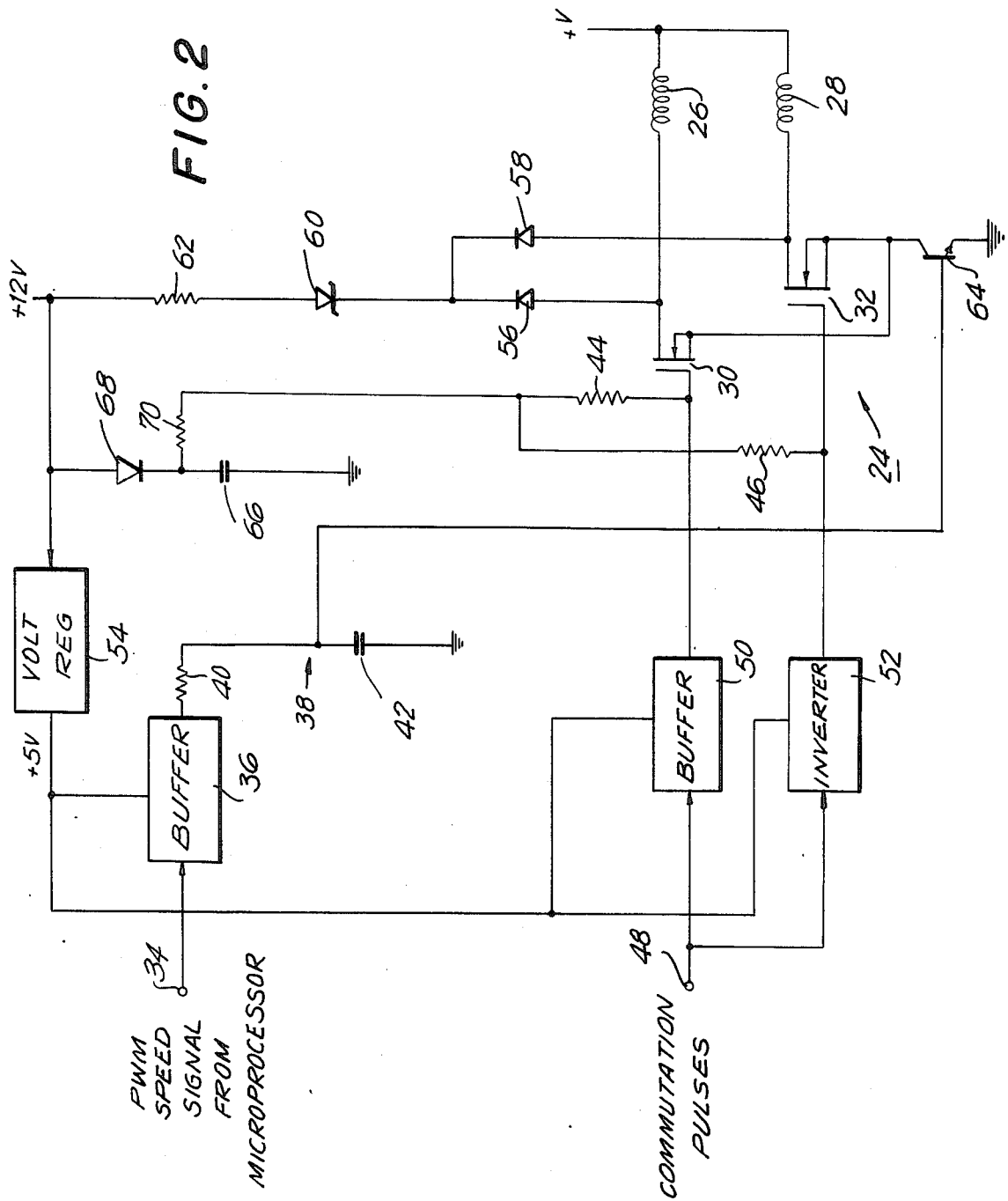
FIG. 2 is a partial block, partial schematic diagram of one embodiment of a motor drive circuit in accordance with the present invention.

Turning now to FIG. 2, there is illustrated in partial block, partial schematic form, one embodiment of a drive circuit 24 that may be used to implement motor drive circuit 14. In particular, motor drive circuit 24 is adapted to drive a 2-phase motor and is referred to herein as a 2-phase drive circuit. For convenience, motor 12 is depicted in FIG. 2 as including two separate phases of motor windings, illustrated as motor phase windings 26 and 28. As shown, motor phase winding 26 is coupled to a switching device 30, preferably formed as an MOS power transistor, described herein as a MOSFET. Similarly, motor phase winding 20 is coupled to a switching device 32, also shown as a MOSFET. In the illustrated embodiment, MOSFETS 30 and 32 are comprised of n-channel MOS devices whose drain electrodes are coupled to windings 26 and 28, respectively, and whose source electrodes are coupled to a reference potential, such as ground, through a controlling bipolar transistor 64. FET devices are advantageous for use in the braking circuit because they exhibit sufficiently high input impedance. As will be described, the braking circuit includes a storage capacitor that need not be very large physically in order to supply enough energy to turn on the FET's for motor-braking. It is seen that the drain-source circuit of MOSFET 30 is connected in series with motor phase winding 26 and transistor 64, and the drain-source circuit of MOSFET 32 likewise is connected in series with motor phase winding 28 and transistor 64. A suitable source of operating potential +V is connected in common to the motor phase windings; and current flows from this source through a respective one of these motor phase windings if the MOSFET connected thereto is rendered conductive. The magnitude of the motor current flowing through the motor phase winding is a function of the conductivity of transistor 64 which, in turn, is a function of the voltage applied to the base electrode thereof.

2-phase drive circuit 24 includes a speed command input 34 to which the speed command signal generated by CPU 16 (FIG. 1) is applied. As an example, this speed command signal may be a PWM signal whose duty cycle is determinative of the speed of the motor. Speed command input 34 is coupled via a conventional buffer circuit 36 to an integrator 38. As one embodiment, the integrator is comprised of a resistor 40 connected to a capacitor 42, the junotion defined therebetween being coupled to the base electrode of transistor 64. As one example, buffer 36 may be a conventional integrated circuit, such as Model 7406. It is recognized that integrator 38 is adapted to convert the PWM signals supplied from speed command input 34 via buffer 36 to a corresponding DC level. This DC level changes as a function of changes in the duty cycle of the PWM signal.

The DC level produced by integrator 38 renders transistor 64 conductive and the current flowing through the collector-emitter circuit thereof also flows through MOSFET 30 or MOSFET 32, depending upon which is actuated. Actuation of the MOSFETS is determined by commutation pulses supplied to commutation input 48, this input being coupled via a buffer 50 to the gate electrode of MOSFET 30 and being coupled via an inverting buffer 52 to the gate electrode of MOSFET 32. As mentioned above, the commutation pulses may be supplied directly from commutation signal generator 19 (FIG. 1) which generates commutation signals as the motor rotates. Alternatively, the commutation pulses may be supplied by CPU 16 in response to the index pulses that are applied to the CPU by index signal generator 18. In the preferred embodiment, the commutation pulses exhibit a rectangular waveform which undergoes transitions when the motor armature and ferromagnetic element rotate past a suitable pick-up, such as the aforementioned Hall sensor. For example, the rectangular waveform may undergo a positive transition when a predetermined point on motor phase winding 26 is juxtaposed the Hall sensor, and the rectangular waveform then may undergo a negative transition when a comparable predetermined point on motor phase winding 28 is juxtaposed the Hall sensor. In one embodiment, the positive portion of the rectangular waveform may extend for a period equal to 180° of angular rotation of the motor or, if desired, both the positive and negative portions of the rectangular waveform may extend for substantially equal periods of 90° of rotation, 45° of rotation, or any desired amount. It is appreciated that the number of cycles of the rectangular waveform which are generated during one complete revolution of the motor is a function of the number of ferromagnetic elements (or the like) which may be spaced about the rotor.

A suitable power supply (not shown) is used to apply the voltage +V to motor phase windings 26 and 28. This power supply also may produce a voltage which, as a numerical example, may be on the order of about +12 V, this voltage being used to supply a relatively lower, regulated voltage to the various buffer circuits 36, 50 and 52 shown in FIG. 2. In this regard, a voltage regulator 54, which forms no part of the present invention per se, is responsive to the +12 V voltage to generate a regulated voltage on the order of about +5 V.

FIG. 2 also illustrates one embodiment of brake circuit 20, this embodiment being comprised of a storage capacitor 66 which is supplied with the +12 V voltage via a forward-poled diode 68. The junction defined by capacitor 66 and diode 68 is coupled via a relatively high resistance resistor 70 to resistors 44 and 46 and, thence, to the gate electrodes of MOSFETS 30 and 32, respectively. As will be described, the resistance of resistor 70 is sufficiently high, such as on the order of about 1 megohms, so as to prevent the voltage level stored across capacitor 66 from being supplied to MOSFETS 30 and 32 during normal operation of 2-phase drive circuit 24. However, because of the high input impedances of the MOSFETS, capacitor 66 need not be of a large physical size to render the MOSFETS conductive for braking.

As also shown in FIG. 2, snubbing diodes 56 and 58 are coupled to the drain electrodes of MOSFETS 30 and 32, respectively, these snubbing diodes having their cathode electrodes connected in common and through a series circuit comprised of a zener diode 60 and a resistor 62 to the power supply. The purpose of snubbing diodes 56 and 58 is to protect MOSFETS 30 and 32 from being damaged in the event of excessive voltage when a MOSFET is turned off suddenly in response to a commutation pulse.

The manner in which the 2-phase drive circuit illustrated in FIG. 2 operates now will be described. Let it be assumed that the DC motor is operating at or near its desired speed. As the motor rotates, index signals are generated, as described above, and it is further assumed, for simplicity, that the commutation pulses supplied to commutation input 48 undergo one complete cycle as the motor makes one complete revolution. It is further assumed that the commutation pulses exhibit a symmetrically rectangular waveform such that, during the positive portion thereof, buffer 50 actuates MOSFET 30 and, during the negative portion thereof, inverting buffer 52 actuates MOSFET 32. Hence, during one-half of the rotation of the motor, MOSFET 30 is actuated to enable drive current to flow through motor phase winding 26, and during the other half of the motor rotation, MOSFET 32 enables motor drive current to flow through motor phase winding 28. This alternate actuation of MOSFETS 30 and 32 serves to select for energization motor phase windings 26 and 28 alternately.

As will be described in greater detail below, and as has been mentioned above, the CPU supplies PWM speed command signals as the motor rotates. The duty cycle of the PWM command signal is varied to compensate for speed errors. Thus, if the motor rotates too slowly, the duty cycle of the PWM command signal is increased (and the "off" time thereof is decreased) and, conversely, if the motor rotates too rapidly, the duty cycle of the PWM command signal is reduced (and the "off" time is increased). This PWM command signal is supplied to integrator 38 by buffer 36 and is integrated to apply to transistor 64 a DC level that is determined by the PWM duty cycle. The current flowing through the collector-emitter circuit of transistor 64, and through the drain-source circuit of the MOSFET that is actuated, is determined by the PWM command signal.

From the foregoing, it is appreciated that, when the positive portion of the rectangular waveform of the commutation pulse is present at commutation input 48, MOSFET 30 is actuated and the magnitude of the current therethrough is determined by the conductivity of transistor 64 whose conductivity is determined by the DC level supplied thereto from integrator 38. Depending upon the current through the MOSFET, a corresponding motor current flows from the power supply voltage +V, through motor phase winding 26, through the drain-source circuit of MOSFET 30 and through transistor 64 to ground. Likewise, during the negative portion of the rectangular waveform of the commutation pulse applied to commutation input 48, inverting buffer 52 actuates MOSFET 32, and the current through this MOSFET is determined by the DC level supplied from integrator 38. Depending upon this DC level, a corresponding motor current flows from the power supply voltage +V through motor phase winding 28, through the drain-source circuit of MOSFET 32 and through transistor 64 to ground.

If the CPU senses that the motor is operating too slowly, the duty cycle of the PWM command signal is increased, resulting in a higher DC level supplied to transistor 64. Consequently, when one and then the other of MOSFETS 30 and 32 is actuated by the commutation pulses, the current therethrough is increased and a correspondingly higher motor current flows through motor phase winding 26 and then through motor phase winding 28. Conversely, if the CPU senses that the motor is rotating too rapidly, the duty cycle of the PWM command signal is reduced so as to correspondingly reduce the DC level supplied to transistor 64 from integrator 38. As a result, the current through the MOSFETS decreases to decrease the motor current flowing through motor phase winding 26 and then through motor phase winding 28. This operation continues until it is desired to stop the motor.

Let it now be assumed that, in order to stop the rotation of the motor, the power supply is cut off. Prior to the cut off of the power supply, capacitor 66 is charged to a voltage level substantially equal to the power supply voltage +12 V less the drop across diode 68. However, this voltage to which capacitor 66 is charged is not supplied through resistor 70 to the gate electrodes of MOSFETS 30 and 32.

Once the power supply is cut off, the +5 V output of voltage regulator 54 is reduced to zero. Consequently, buffer circuits 36, 50 and 52 are deenergized. These buffer circuits are of a conventional type and, as is known, the output impedance thereof is relatively low during energization but, when the power supply thereto is interrupted, the output impedance of the buffer circuits exhibits a relatively high impedance. Because of the high impedance presented by buffer circuits 36, 50 and 52, the voltage to which capacitor 66 had been charged now is applied via resistor 70 and resistors 44 and 46 to the gate electrodes of MOSFETS 30 and 32, respectively. This voltage, which is seen to be higher than the +5 V output of voltage regulator 54, is sufficient to render MOSFETS 30 and 32 conductive and present short-circuits to motor phase windings 26 and 28. Since both motor phase windings now are short-circuited, the motor is dynamically braked.

Preferably, storage capacitor 66 is of sufficient capacitance so as to not be fully discharged before the motor is braked, yet is not physically large because of the high input impedances of MOSFETS 30 and 32. As a numerical example, if resistor 70 is on the order of 1 megohm, and if capacitor 66 is on the order of 22 microfarads, then the time constant of the RC circuit formed of resistor 70 and capacitor 66 is on the order of about 20 seconds. This time constant exceeds the expected time duration of dynamically braking the motor to a stop.

Figure 3:
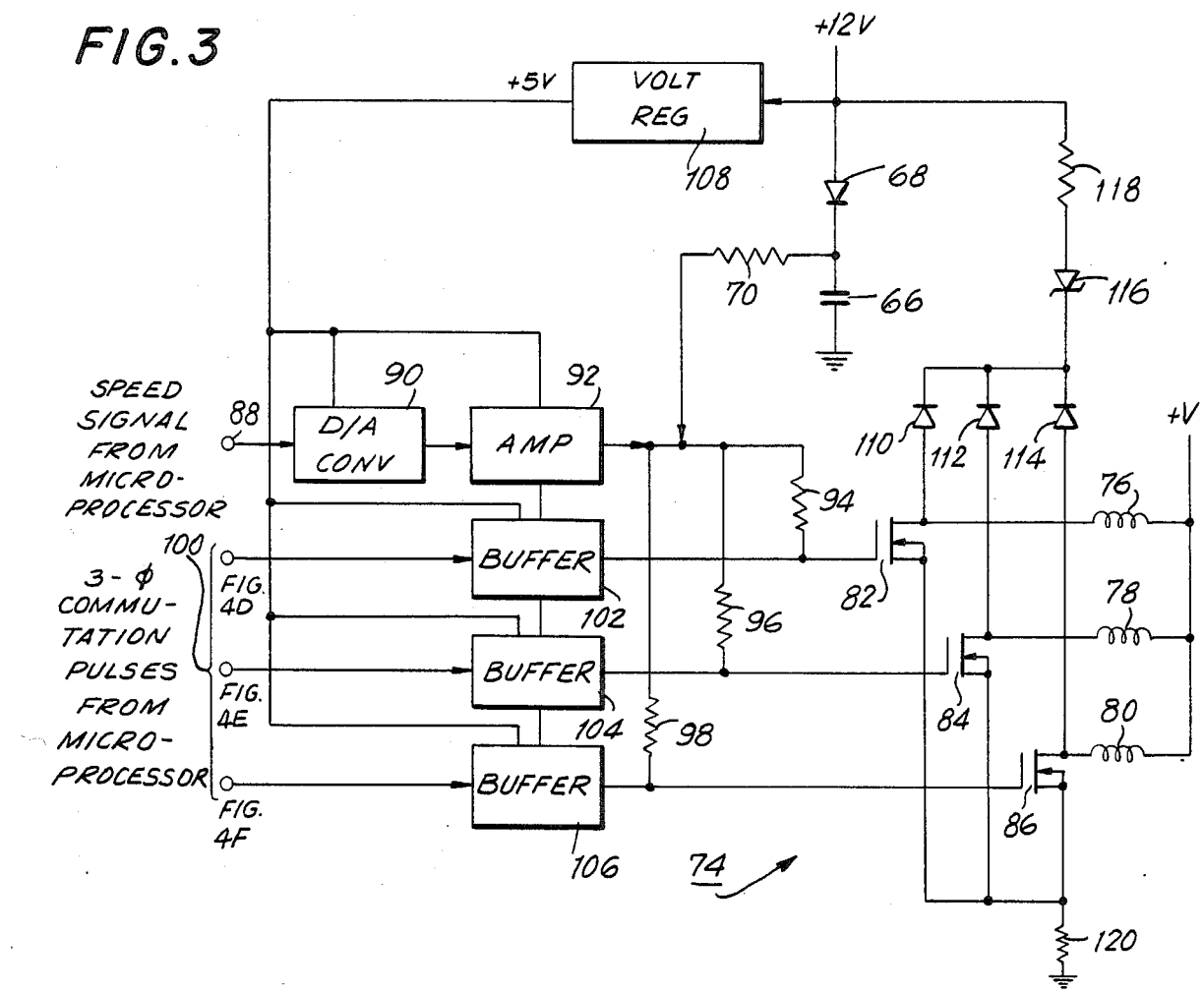
FIG. 3 is a partial block, partial schematic diagram of another embodiment of a motor drive circuit in accordance with the present invention.

Yet another embodiment of a motor drive circuit that may be used with the present invention is illustrated in partial block, partial schematic form in FIG. 3. As described above with respect to the block diagram shown in FIG. 1, the present invention is applicable to a 2-phase motor and also to a 3-phase motor. For convenience, therefore, FIG. 3 illustrates one embodiment of a 3-phase drive circuit 74.

The 3-phase drive circuit shown in FIG. 3 is similar in many respects to the 2-phase drive circuit shown in FIG. 2. In the FIG. 3 embodiment, the motor which is driven thereby is provided with three motor phase windings 76, 78 and 80, these three phases being connected in common to a suitable power supply +V. Motor phase winding 76 is connected in series with the source-drain circuit of a MOSFET 82, motor phase winding 78 is connected in series with the source-drain circuit of a MOSFET 84, and motor phase winding 80 is connected in series with the source-drain circuit of a MOSFET 86. In the illustrated embodiment, each MOSFET is an n-channel MOS device, the source electrodes thereof being coupled to ground via a noise filter resistor 120.

The gate electrodes of MOSFETS 82, 84 and 86 are adapted to be supplied with a motor drive signal. In the embodiment shown in FIG. 3, the motor drive signal is derived from the motor command signal produced by the CPU (FIG. 1), this command signal being applied to a speed command input 88. Whereas the speed command signal that is supplied to the speed command input in the embodiment of FIG. 2 has been described as a PWM signal, the speed command signal supplied to speed command input 88 (FIG. 3) is assumed herein merely to be a digital signal whose value (e.g. whose numerical value) is determinative of the speed at which the motor is driven. Hence, speed command input 88 may be comprised of plural parallel inputs to which the digital speed command signal is supplied in parallel or, alternatively, the speed command input may be formed of a single input to which the digital speed command signal is serially supplied.

Speed command input 88 is coupled to a digital-to-analog converter 90 which, in turn, converts the digital command signal to a corresponding DC level. This DC level is supplied via a suitable amplifier 92 to the gate electrodes of MOSFETS 82, 84 and 86 by means of resistors 94, 96 and 98, respectively. Amplifier 92 may function as a buffer or, alternatively, the amplifier may function to increase the DC level by a fixed gain.

The DC level supplied to the gate electrodes of MOSFETS 82, 84 and 86 by amplifier 92 is not sufficient to render conductive any of these MOSFETS. However, the combination of the DC level with a commutation pulse controls the conductivity of the MOSFET to which the commutation pulse is applied. In this regard, a commutation input 100 is adapted to be supplied with 3-phase commutation pulses which, in one embodiment, are supplied by CPU 16 and, in an alternative embodiment, are supplied by the commutation signal generator shown in FIG. 1. More particularly, commutation input 100 is formed of three separate inputs coupled to buffers 102, 104 and 106, respectively. As will be described below, only a single commutation pulse is applied to any of these inputs at any given time.

Buffers 102, 104 and 106 may be similar to aforedescribed buffer 50, these buffers being connected to the gate electrodes of MOSFETS 82, 84 and 86, respectively.

FIG. 3 also illustrates the brake circuit shown in FIG. 2 and discussed above. The junction defined by capacitor 66 and diode 68 is coupled via resistor 70 to the output of amplifier 92. The brake circuit shown in FIG. 3 performs substantially the same function in the same way as the brake circuit shown in FIG. 2.

FIG. 3 also illustrates the use of snubbing diodes 110, 112 and 114 connected to the drain electrodes of MOSFETS 82, 84 and 86, respectively, these snubbing diodes having their cathodes connected in common through a zener diode 116 connected in series with a resistor 118 to the power supply voltage +12 V. As before, the purpose of the snubbing diodes shown in FIG. 3 is to protect the MOSFETS against damage that may be due to excessive voltage when a MOSFET is de-actuated by a commutation pulse.

Figure 4A:
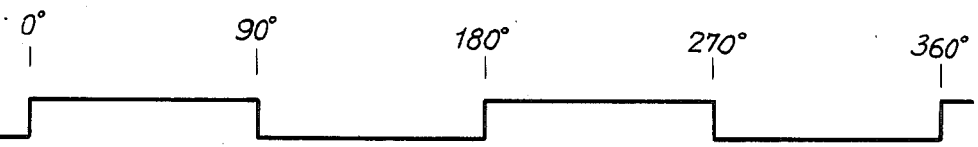
FIGS. 4A-4F are waveform diagrams which are useful in understanding the operation of the motor drive circuit shown in FIG. 3.

The manner in which 3-phase drive circuit 74 operates now will be described with reference to the waveforms shown in FIGS. 4A–4F. For simplification, let it be assumed that a separate Hall sensor or other suitable pick-up is provided for each of the three phases of the motor. Let it be further assumed that each phase is provided with a suitable number of angularly spaced apart ferromagnetic elements, or other suitable triggering devices, such that the Hall sensor generates a rectangular waveform exhibiting two cycles during one complete revolution of the motor, each cycle being symmetrical and formed of a positive portion and a negative portion of equal duration. Thus, for phase I, the index signal generated by the Hall sensor associated therewith may be as illustrated in FIG. 4A during a 360° rotation of the motor. Similar Hall sensors, or equivalent pick-ups, and ferromagnetic elements, or suitable trigger devices, are provided for motor phases II and III to generate the index signals shown in FIGS. 4B and 4C, respectively. As an example, the ferromagnetic elements which may be provided for motor phase II are angularly spaced by 60° from the ferromagnetic elements of phase I; and the ferromagnetic elements of phase III are angularly spaced by 60° from the ferromagnetic elements of phase II. As an alternative, the Hall sensors may be spaced from each other by these angular amounts and a common one or two ferromagnetic elements may be used to trigger each sensor.

Figure 4B:
Figure 4C:
Figure 4D:
Figure 4E:
Figure 4F:

The CPU is supplied with the index signals shown in FIGS. 4A, 4B and 4C and, in a manner that will be known to those of ordinary skill in the art, generates the commutation pulses shown in FIGS. 4D, 4E and 4F. Alternatively, suitable discrete circuitry may be used to generate the commutation pulses of FIGS. 4D–4F from the index pulses shown in FIGS. 4A–4C. For example, commutation pulses suitable to select motor phase I (such as the commutation pulses shown in FIG. 4D) may be produced when the positive portion of the index pulse shown in FIG. 4A coincides with the negative portion of the index pulse shown in FIG. 4B. Likewise, the commutation pulses shown in FIG. 4E (suitable to select motor phase II for energization) may be produced when the positive portion of the index pulse shown in FIG. 4B coincides with the negative portion of the index pulse shown in FIG. 4C. In like manner, the commutation pulses shown in FIG. 4F (which are adapted to select motor phase III) may be produced when the positive portion of the index pulse shown in FIG. 4C coincides with the negative portion of the index pulse shown in FIG. 4A. Thus, for each motor phase, two commutation pulses are generated during 360° rotation of the motor, each of these commutation pulses having a duration corresponding to about 60° of motor rotation (i.e. 60° mechanical) with successive pulses being separated by 120° mechanical.

In the embodiment described herein, the commutation pulses shown in FIG. 4D are supplied to buffer 102, the commutation pulses shown in FIG. 4E are supplied to buffer 104 and the commutation pulses shown in FIG. 4F are supplied to buffer 106. It is recognized that only one of these commutation pulses is positive at any given time, and the MOSFET which is supplied with the positive commutation pulse is actuated.

The actuated MOSFET, that is, the MOSFET that is turned "on" by a commutation pulse, is rendered conductive by the DC level supplied thereto from amplifier 92. Hence, the degree of conductivity of the actuated MOSFET is a function of the DC level supplied thereto which, in turn, is determined by the motor speed command signal supplied from the CPU to speed command input 88. The degree of conductivity of the MOSFET determines the motor current flowing in the motor phase winding connected thereto and this, in turn, establishes the rotary speed of the motor.

It is recognized that the brake circuit shown in FIG. 3 is substantially the same as the brake circuit shown in FIG. 2. Hence, in the interest of brevity, and in order to avoid unnecessary duplication, the description of the manner in which the brake circuit operates in FIG. 3 is not described. Suffice it to say that capacitor 66 is charged to a suitable voltage level when power is supplied from the power supply (not shown) to 3-phase drive circuit 74, and this voltage is applied to all of the MOSFETS simultaneously when the power supply is cut off. This is because the output impedances of amplifier 92 and buffers 102, 104 and 106 revert to a relatively high impedance level when operating power from voltage regulator 108 is removed therefrom, thus permitting the voltage stored across capacitor 66 to be supplied to the MOSFETS. As described in the embodiment of FIG. 2, when the MOSFETS are rendered conductive simultaneously, motor phase windings 76, 78 and 80 are short-circuited therethrough, thus dynamically braking the motor.

Figure 5:
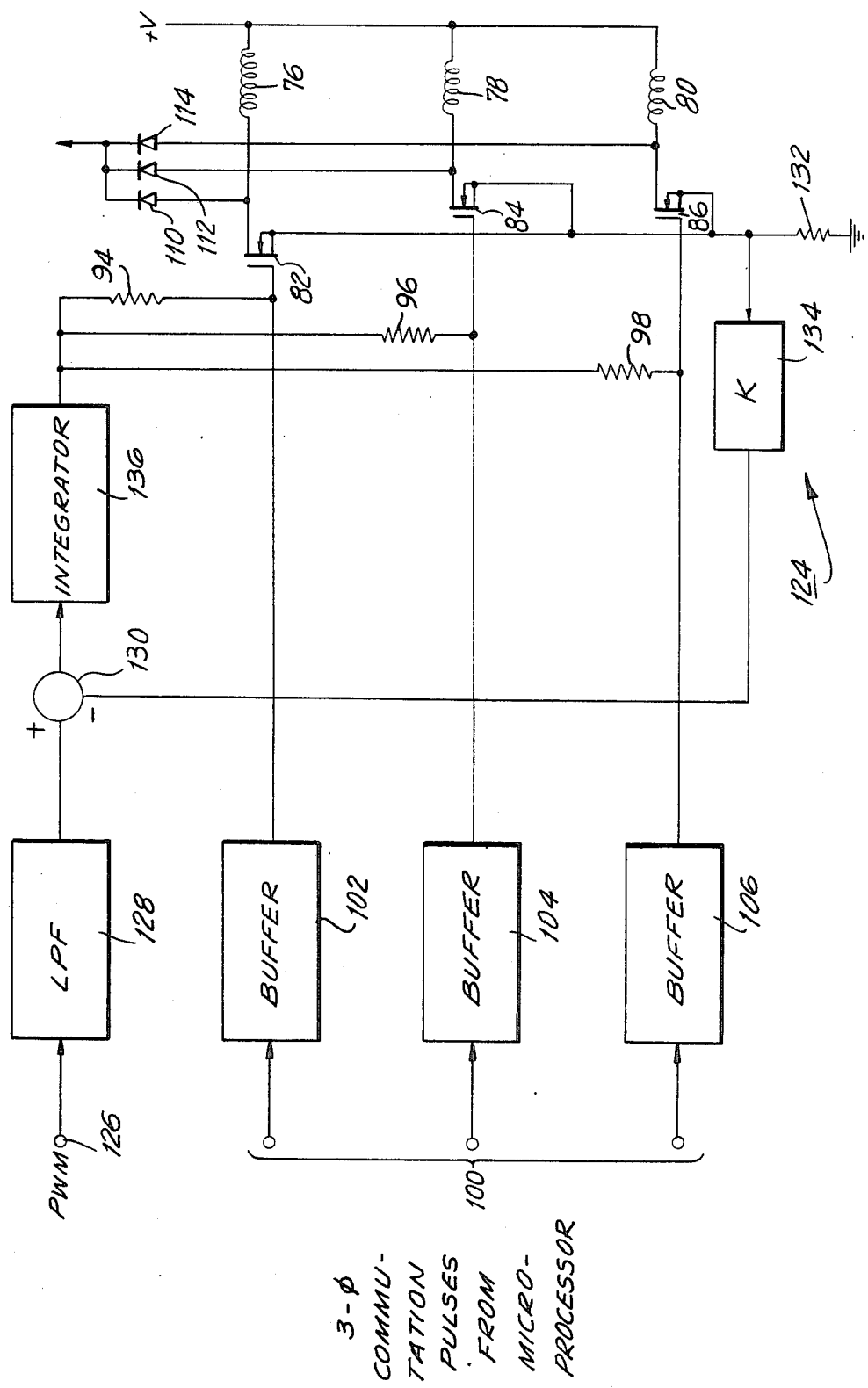
FIG. 5 is a partial block, partial schematic diagram of a preferred embodiment of a motor drive circuit in accordance with the present invention.

Yet another embodiment of the motor drive circuit is illustrated in FIG. 5. For purposes of explanation, and with the intent of not being limited solely to the description herein, the motor drive circuit shown in FIG. 5 is illustrated as a 3-phase drive circuit 124 which, of course, can be used in a manner similar to the 3-phase drive circuit shown in FIG. 3. It will be appreciated, however, that the differences between these 3-phase drive circuits 74 and 124 are equally applicable to a 2-phase drive circuit, such as that shown in FIG. 2. That is, the circuit shown in FIG. 2 may be modified to include the features of FIG. 5. For convenience, and in order to limit the present explanation merely to the differences between the FIGS. 3 and 5 embodiments, the same reference numerals are used in FIG. 5 to identify those components which have been discussed previously with respect to the embodiment of FIG. 3.

Briefly, it is seen that the 3-phases of the motor windings 76, 78 and 80 are driven by MOSFETS 82, 84 and 86, respectively, these MOSFETS being selectively actuated by commutation pulses supplied individually to the MOSFETS from commutation input 100 via buffers 102, 104 and 106, respectively. Thus, depending upon the rotary position of the motor, one and only one commutation pulse is supplied to one of these buffers and, correspondingly, one and only one of MOSFETS 82, 84 and 86 is actuated to supply a motor drive signal to the motor phase winding connected thereto. It is recognized that the motor drive signal is derived from the speed command signal produced by the CPU, and this speed command signal may be a PWM signal, as in the embodiment of FIG. 2, or a digital signal, as in the embodiment of FIG. 3. It is further appreciated that, in the motor drive circuit shown in FIG. 5 as well as the motor drive circuits shown in the preceding embodiments, the speed command signal may take other forms, such as a pulse amplitude signal, a pulse position signal, or the like. Again, merely for convenience, the motor command signal that is supplied to motor drive circuit 124 in FIG. 5 is assumed herein to be a PWM signal.

In the embodiment shown in FIG. 5, the motor drive circuit includes a feedback circuit for feeding back a signal representing the magnitude of the current actually flowing through the motor and combining this fed back signal with the motor drive signal derived from the CPU-generated speed command signal. To this effect, a mixer, or subtracting circuit 130, has one input coupled through a low pass filter 128 to speed command input 126 and another input coupled to receive a signal representative of the actual current flowing through the motor. This current-representing signal is produced by a current-to-voltage converter 132 which, in its simplest form, may comprise a resistor, such as a calibrating resistor, connected in common to the source-drain circuits of MOSFETS 82, 84 and 86. It is appreciated that the current flowing through any one of motor phase windings 76, 78 and 80 also flows through resistor 132 to produce a voltage thereacross that is proportional to this current. Resistor 132 is coupled to a level adjustment circuit 134 which, as an example, may comprise an amplifier having constant gain K to amplify, or level-adjust, the voltage produced across resistor 132. The level-adjusted voltage provided by amplifier 134 is applied to mixer 130 to be subtracted from the motor drive signal produced by low pass filter 128. The resultant difference between the motor drive signal and the motor current representing signal is supplied to an integrator 136 from which a DC level is applied in common via resistors 94, 96 and 98 to the gate circuits of MOSFETS 82, 84 and 86, respectively.

In the interest of simplification, an illustration of the brake circuit is omitted from FIG. 5. Nevertheless, it will be appreciated that the brake circuit advantageously may be used with this embodiment and may be connected thereto in the manner shown in FIG. 3. Also, it will be appreciated that a power supply is connected to the embodiment of FIG. 5 in order to supply operating voltage to the various components illustrated therein. Although snubbing diodes 110, 112 and 114 are shown partially connected in FIG. 5, it will be appreciated that these snubbing diodes may be connected to additional circuitry, such as shown in FIG. 3. It is believed that the further illustrations of the brake circuit, power supply and additional connections to the snubbing diodes are not necessary for an adequate understanding of the embodiment shown herein.

In operation, the speed command signal supplied to speed command input 126 is converted to a motor drive signal by low pass filter 128 and supplied to, for example, the positive input of mixer 130. In the embodiment wherein the speed command signal is a PWM signal, low pass filter 128 functions as an integrator, similar to the integrator shown in FIG. 2. Alternatively, if the speed command signal is a digital signal, such as that described in the embodiment of FIG. 3, low pass filter 128 may be replaced by a digital-to-analog converter and a suitable amplifier, such as shown in FIG. 3. In either embodiment, mixer 130 is supplied with a motor drive signal having a magnitude (e.g. a DC level) determined by the speed command signal.

During normal operation, only one of MOSFETS 82, 84 and 86 is actuated at any given time in response to the commutation pulses supplied to commutation input 100. Irrespective of the particular MOSFET which is actuated, it is expected that, if there is no change in the speed command signal, the motor current flowing through the motor phase winding that is connected to the actuated MOSFET will be the same. That is, if MOSFET 82, 84 or 86 is actuated, the motor current flowing through motor phase winding 76, 78 or 80 will be the same; and this motor current also flows through current-to-voltage converting resistor 132. Hence, the voltage produced across this resistor is directly proportional to the current flowing therethrough and, thus, level adjustment circuit 134 is supplied with a voltage that represents the motor current. After adjusting the level of this voltage, level adjustment circuit 134 supplies it to mixer 130, whereat the level-adjusted voltage is subtracted from the motor drive signal derived from the speed command signal. The difference signal produced by mixer 130 thus represents the difference between the commanded motor speed and the actual motor current. At optimum speed, that is, when the motor is driven at the very speed commanded by the CPU, the motor drive signal supplied to mixer 130 by low pass filter 128 is equal to the fed back motor current signal supplied to the mixer by level adjustment circuit 134. It is appreciated that the gain K of circuit 134 thus may be selected in accordance with this desired condition.

The difference signal produced by mixer 130, that is, the difference between the motor drive signal produced by low pass filter 128 and the fed back motor current signal produced by level adjustment circuit 134, is integrated by integrator 136 and supplied as a drive signal to MOSFETS 82, 84 and 86. Depending upon which of these MOSFETS is actuated by the commutation pulse then applied to commutation input 100, the conductivity of the actuated MOSFET is a function of this driven signal. Consequently, the current flowing through the motor phase winding that is connected to this actuated MOSFET likewise is a function of this drive signal.

In the preceding discussions of the various embodiments of the motor drive circuit, the current flowing through the actuated MOSFET has been described as being controlled or determined by the level of the drive signal that is supplied by integrator 38 (FIG. 2), amplifier 92 (FIG. 3) or integrator 136 (FIG. 5). As is appreciated, since a MOSFET is an amplifying device, the magnitude of the drain-source current flowing therethrough and, thus, the magnitude of the current flowing through the motor phase winding connected thereto, is a function of the gate-source voltage. If this gate-source voltage increases, that is, if the drive signal is supplied to the gate of the actuated MOSFET, and if this drive signal increases, the drain-source current likewise increases. Conversely, if the magnitude of the gate voltage decreases, the drain-source current decreases. It is seen, therefore, that the current flowing through a motor phase winding need not be determined solely by the conductivity of the MOSFET connected thereto because the MOSFET functions as an amplifying device in accordance with its conventional operation.

The preceding description has been directed primarily to various embodiments of the motor drive circuit. As described above, it is the CPU which supplies the motor drive circuit with the speed command signal from which the motor current is adjusted in each phase so as to bring the motor speed into conformance with the commanded speed. As has also been described, the CPU executes, among other routines and programmed instructions which form no part of the present invention per se, a motor start up routine by which the motor is driven rapidly to its desired operating speed and a motor control routine by which the operating speed of the motor is controlled to maintain its desired speed. These two routines now will be described in conjunction with the flow charts shown in FIGS. 6A-6B and 7.

Figure 6A:
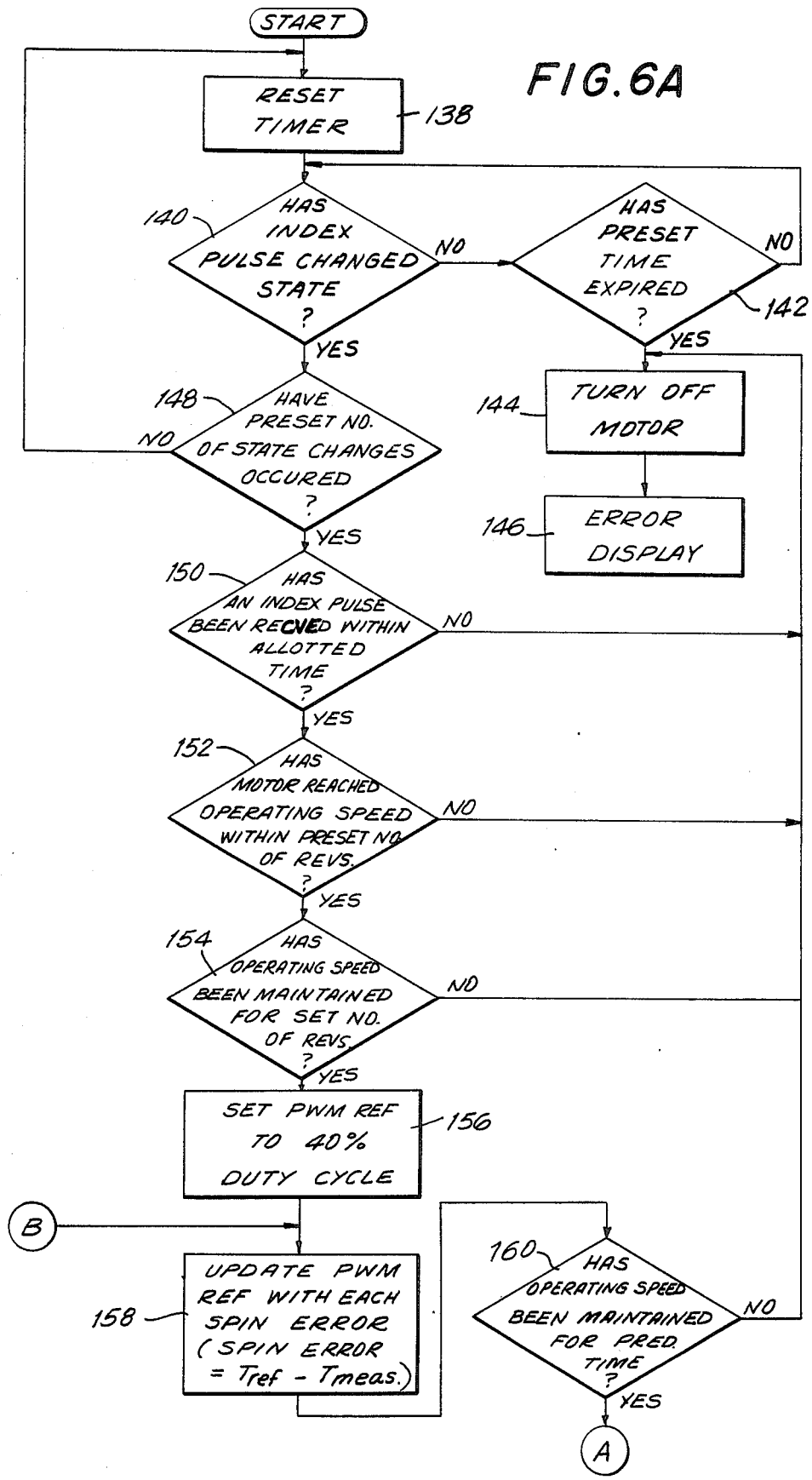
FIGS. 6A-6B are flow charts representing a motor start-up routine that is used with the present invention.
Figure 6B:
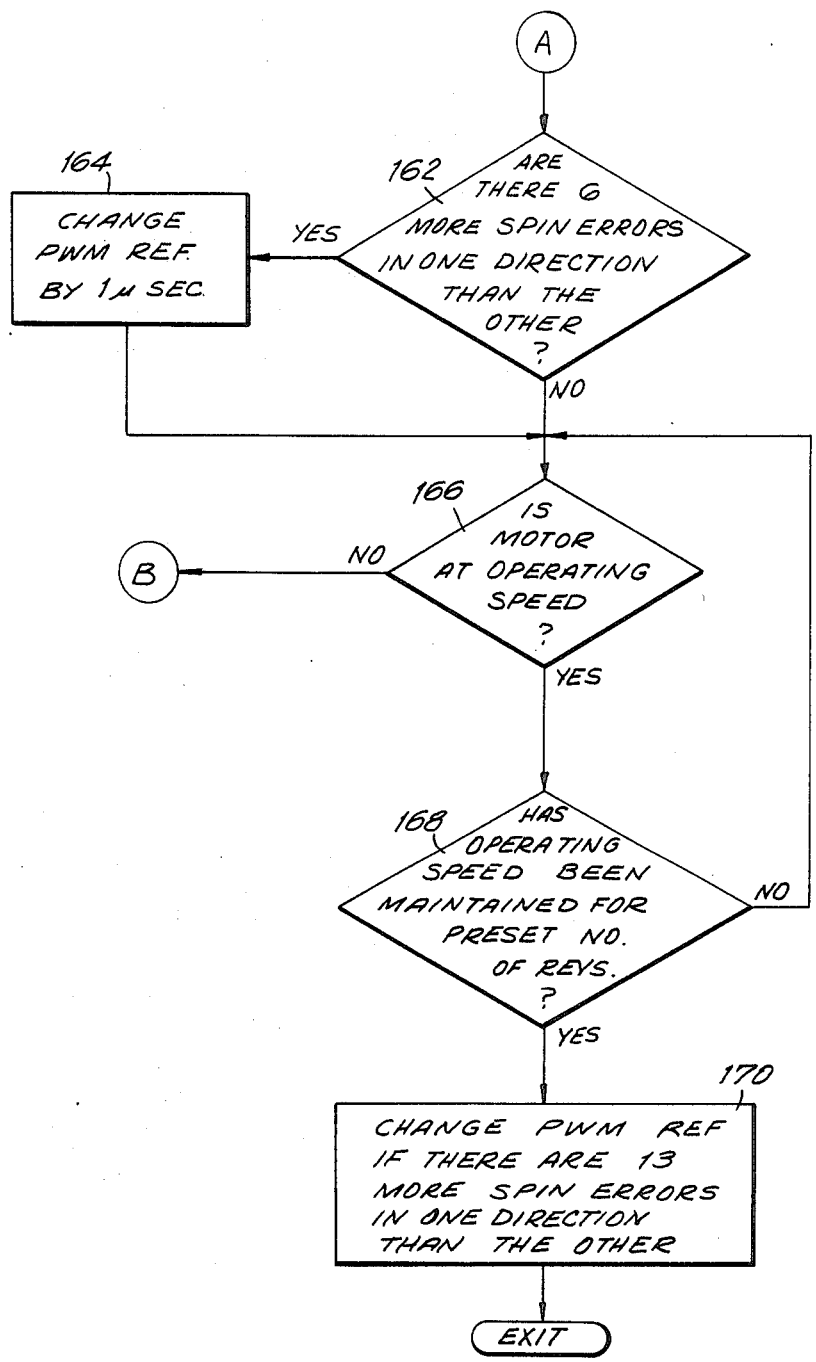

Referring first to the flow charts of FIGS. 6A and 6B, these flow charts represent the start up routine executed by the CPU to bring the motor rapidly to its operating speed of, for example, 3600 rpm. It is recognized that this start up routine is initiated in accordance with the overall programmed set of instructions for the CPU, and the manner in which this routine is selected by the CPU instructions is not necessary for an adequate understanding of the start up routine and, thus, need not be described.

Upon entering the start up routine, the CPU generates a start-up command signal (not shown) to apply, for example, maximum current through the motor windings, and also resets a timer. For clarity of understanding, the various instructions shown in the flow charts herein are identified by reference numerals. Nevertheless, it will be appreciated that each illustrated instruction may be comprised of several steps, as are known to those of ordinary skill in the art, but may be adequately described merely as an "instruction step". Such steps may call for positive action, such as the present step of resetting a timer, or may call for an inquiry, such as after the timer has been reset (block 138), inquiring in block 140 whether the output of index signal generator 18 (FIG. 1) has changed its state. If the index pulse has not changed its state, or level, that is, if a positive or negative transition has not yet been produced, the CPU advances to block 142 to inquire if the timer, which had just been reset, has reached a preset time of expiration. If this inquiry is answered in the negative, the CPU cycles through the loop of blocks 140 and 142 until either the index pulse has changed its state or the timer, after being reset initially, finally has timed out. Although not shown herein, it will be appreciated that the timer is updated or incremented periodically, such as in accordance with the usual processor clock.

If the timer has timed out before the index pulse has changed state, it is assumed that the motor has not operated or, alternatively, the index signal generator is not operating properly. In either event, upon an affirmative answer to the inquiry of block 142, the CPU advances to block 144 to turn off or deenergize the motor and then to block 146 to provide a suitable error display, such as a flashing indicator or the like.

If, prior to the timing out of the timer, the inquiry of block 140 is answered in the affirmative, that is, a change of state in the index pulse has occurred, the CPU advances to block 148 to inquire whether a preset number of state changes, or transitions, in the index pulse has occurred. For example, the start up routine may "look for" the leading or trailing edge of each index pulse and, thus, may be responsive to every other change in state. Alternatively, the start up routine may "look for" every second, third, fourth or xth index pulse and may base its decisions on detecting such xth index pulse. In that event, a preset number of state changes are counted until the xth index pulse is detected.

If the inquiry of block 148 is answered in the negative, the start up routine returns to block 138 to reset the timer and then carry out the remaining steps illustrated therein. However, if the preset number of index pulse state changes has occurred, then the inquiry of block 148 is answered in the affirmative and the start up routine advances to block 150 to inquire whether an index pulse has been received within an allotted period of time. If this inquiry is answered in the negative, it is assumed that, although the index pulse has changed state (block 140) and a preset number of such state changes has occurred (block 148), nevertheless the motor is rotating too slowly because successive index pulses (or those selected index pulses which are to be sensed) are spaced too far apart and, thus, do not occur within the allotted predetermined period of time. A negative answer to the inquiry of block 150 results in the turning off of the motor and an error is displayed.

If the inquiry of block 150 is answered in the affirmative, that is, if an index pulse has been received within the allotted predetermined period of time, the start up routine advances to block 152 to inquire if the motor has reached its operating speed range within a preset number of revolutions. If this inquiry is answered in the negative, that is, after the preset number of revolutions has occurred the motor still has not reached its operating speed range, the motor is turned off and an error indication is displayed. But, if the operating speed range has been reached successfully within the preset number of motor revolutions, the routine advances to block 154 to inquire if the motor operating speed has been maintained within its proper range for a predetermined number of revolutions. Thus, it is seen that it is not sufficient merely for the motor to reach its operating speed range. Rather, the motor speed must be maintained in the desired range for at least a predetermined number of revolutions. If the inquiry of block 154 is answered in the negative, the routine advances to turn off the motor and display an error indication.

However, once the start up routine has advanced to an affirmative answer to the inquiry of block 154, the following conditions will have been established: the index pulse has changed state, a preset number of such state changes has occurred, successive (or selected) index pulses have been received within the allotted predetermined time period (i.e. the motor is not operating too slowly), the motor operating speed range has been reached within a preset number of revolutions, and the motor speed has been maintained within its operating range for a predetermined number of revolutions. The routine then advances to block 156 to set the speed command signal to a predetermined level. In the embodiment wherein the speed command signal is a PWM signal, the duty cycle of this PWM signal is set to 40%. In the embodiment wherein the speed command signal is a digital signal, a comparable value or level is set for this digital signal. Thus, at this point, the speed command signal has been reduced from a relatively high or even a maximum level to, for example, a level corresponding to a 40% PWM duty cycle. This, in turn, reduces the energization of the motor from its high or maximum level which, of course, is desirable during the initial start-up phase of motor energization.

Following this setting of the speed command signal, the routine advances to block 158 whereat the speed command reference signal is updated, or changed, to accommodate each detected error (referred to as the spin error). For example, if one index pulse is generated during each rotation of the motor, then the speed command reference signal is updated at each revolution. If two index signals are generated during each 360° revolution of the motor, then the speed command reference signal is updated with each index pulse, or at each rotation of 180°. As a further alternative, if index signals are generated such as in the manner shown in FIGS. 4A–4C, then an error sensing operation may be carried out at every 60° of rotation, such as between the leading edges of the index pulses shown in FIGS. 4A and 4B, or between the leading edges of the index pulses shown in FIGS. 4B and 4C, or between the leading edges of the index pulses shown in FIGS. 4C and 4A.

A "spin error" is referred to as the difference between a reference time period, that is, the expected time period separating two successive or selected index pulses, and a measured time period, that is, the actual time separation between those index pulses. It is seen that this spin error is equal to zero if the motor is operating at its desired or reference speed. However, if the motor is operating too slowly, then the spin error is negative. Conversely, if the motor is operating too rapidly, the spin error is positive. At each spin error measuring time, that is, each time that the spin error is determined, the speed command reference signal is changed. For example, an increase in the "off time" of the PWM command signal is effected if the motor is operating too rapidly, and a decrease in the "off time" of the PWM command signal is effected if the motor is operating too slowly. It is appreciated that the converse of this operation may be carried out, if desired, wherein the reference time period is subtracted from the measured, or actual time period between selected index pulses, with the resultant spin error being used to update the speed command signal.

After carrying out the instructions of block 158, the start up routine advances to block 160 to inquire whether, after updating the speed command reference signal, the operating speed of the motor has been maintained within its desired range for a predetermined period of time. If this inquiry is answered in the negative, that is, if the motor speed cannot be properly maintained within its operating range, the motor is turned off and an error indication is displayed. However, if the motor operating speed has been successfully maintained in its operating range for a predetermined period of time, the routine advances to block 162 to inquire whether the number of spin errors in one direction exceed the number of spin errors in the opposite direction by a predetermined amount. For example, from block 158, it is seen that if the motor is operating consistently too slowly, that is, if the motor speed is within its operating range but, nevertheless, is less than the desired absolute speed thereof, then the difference between the reference time period between selected index pulses and the actually measured time period will produce a negative spin error. If, as a numerical example, there are six more accumulated negative spin errors than there are accumulated positive spin errors, the inquiry of block 162 is answered in the affirmative. Conversely, if the motor is operating within its desired speed range but consistently operates slightly faster than the absolute desired speed, then the actual time period between selected index pulses will be less than the reference time period therebetween, resulting in a positive spin error. If there are six more accumulated positive spin errors than there are negative accumulated spin errors, the inquiry of block 162 is answered in the affirmative. However, if the motor speed "hunts" about its desired absolute value, then the inquiry of block 162 will be answered in the negative.

Assuming that the number of accumulated spin errors in one direction does not exceed the number of accumulated spin errors in the opposite direction by the predetermined amount, the resultant negative answer to the inquiry of block 162 then results in the inquiry of block 166 as to whether the motor still is operating within its desired speed range. If not, the routine returns to block 158, and the loop comprised of blocks 158, 160, 162 and 166 is repeated until either the inquiry of block 160 is answered in the negative, whereupon the motor is turned off, or the inquiry of block 162 is answered in the affirmative.

It is assumed that if there are, for example, six more negative spin errors than positive spin errors, the motor is operating too slowly because the reference speed command signal is not sufficiently high. Conversely, if the motor is operating too rapidly such that there are six more positive spin errors than negative spin errors, it is because the reference speed command signal is too high. Thus, if the inquiry of block 162 is answered in the affirmative, the reference speed command signal is modified by a predetermined amount. For example, if the reference speed command signal is a PWM signal, the duty cycle or, alternatively, the off time thereof, is increased or decreased by, for example, one microsecond, depending upon whether there is an excess of negative or positive spin errors, respectively. Thereafter, the routine advances to the inquiry of block 166.

It is expected that the aforementioned change in the reference speed command signal will be sufficient to eliminate the preponderance of spin errors in one direction. If not, the routine cycles through the loop comprised of blocks 166, 158, 160, 162 and 164, whereby additional changes in the reference speed command signal are made, if necessary.

If the inquiry of block 166 is answered in the affirmative, that is, if the motor continues to operate within its operating speed range, the routine advances to the inquiry of block 168 to determine whether the operating speed of the motor has been maintained within its desired range for a preset number of revolutions. This inquiry is seen to be similar to the inquiry of block 154 and, if desired, the same number of revolutions may be used in both inquiries to ascertain whether the operating speed of the motor has been properly maintained. If the answer to the inquiry of block 168 is negative, the routine returns to block 166 to inquire if the motor is operating within its operating speed range. If not, the routine cycles once again through the loop formed of blocks 158, 160, 162, 164 and 166 until it is determined, by the inquiry of block 168, that the operating speed range of the motor has, in fact, been maintained for a preset number of revolutions. At that time, the routine advances to block 170 which functions to change the reference command signal by a predetermined amount (for example, the PWM duty cycle or off time may be changed by one microsecond) if there are thirteen more spin errors in one direction than the other. Block 170 may be seen to be similar to the combination of blocks 162 and 164, except that, in carrying out the instructions of block 170, the reference speed command signal is changed at a much slower rate. It is appreciated that when the routine advances to block 170, there is more tolerance to the spin errors because, at this stage, the motor will have been operating within its operating speed range very close to or at the desired absolute speed value.

After carrying out the instructions of block 170 (which, it is appreciated, are comprised of several instructions that may be repeated a number of times), the CPU exits from the start up routine.

From the foregoing discussion of the flow diagrams shown in FIGS. 6A and 6B, it is seen that, if the motor successfully reaches its operating speed range within a predetermined number of revolutions and has maintained its speed within that range for a satisfactory number of revolutions, the reference speed command signal initially is changed at a rapid rate (for example, with each detected spin error, as represented by block 158), and then is changed at a slower rate (for example, if there are six more spin errors in one direction than the other, as represented by block 162), and then at a still slower rate (for example, if there are thirteen more spin errors in one direction than in the other, as represented by block 170), provided that the motor remains within its operating speed range throughout.

In general, after completing its start up routine, the CPU will not return to this routine until another start up operation is called for by the CPU program. Typically, this operation is carried out only during initial start up phases when power initially is applied to the motor and motor drive circuit. However, in the event that a substantial change in motor speed occurs, this routine may be entered once again. The conditions under which the start up routine is carried out form no part of the present invention per se and, thus, in the interest of brevity, need not be discussed herein.

Referring now to the flow chart shown in FIG. 7, there is illustrated the motor control routine that is executed by the CPU to modify the speed command signal supplied to the motor drive circuit in order to compensate for detected errors in the motor speed. This motor control routine is carried out periodically when, for example, an index pulse is detected. For example, the CPU may include a suitable interrupt routine that is responsive to such an index pulse, whereupon the motor control routine is carried out.

Initially, the CPU advances to block 180 to measure the time duration between a previously sensed index pulse and the newly generated index pulse. This time duration is referred to herein as the index time, and the presently measured index time is designated the "new" index time.

Once this new index time is measured, the routine advances to block 182, whereupon the "old" index time is subtracted from this new index time. It will be appreciated that the "old" index time refers to the index time that had been measured during a previous measuring operation. As a numerical example, if the time separation between successive index pulses is measured, and if first, second and third index pulses had been generated, then the time separation between the first and second index pulses comprises the "old" index time, and the time separation between the second and third index pulses comprises the "new" index time.

After the old index time has been subtracted from the new index time, the routine advances to block 184, whereupon the difference between these successive index times is designated the "previous revolution time". It will be understood that the "previous revolution time" does not necessarily refer to the time required for a complete 360° revolution. Rather, it is a simple designation by which the differences between successively measured index time periods (or, alternatively, selected index time periods) can be identified. The "previous revolution time" can be ascertained merely from a partial rotation or revolution of the motor. For example, and with reference to the index pulses shown in FIGS. 4A–4C, the "old" index time may be the time separation between the leading edges of the pulses shown in FIGS. 4A and 4B, the "new" index time may be the time separation between the leading edges of the pulses shown in FIGS. 4B and 4C, and the "previous revolution time" may be ascertained upon detecting the leading of the pulse shown in FIG. 4C.

After designating the difference between the measured index times as the "previous revolution time", the motor control routine advances to block 186 whereby the spin error is calculated. As shown in FIG. 7, the spin error is equal to the difference between the "previous revolution time" and a reference revolution time. This reference revolution time may comprise any suitable time period, such as zero or some other value, if preferred. It is expected that the "previous revolution time" will be equal to the reference revolution time if the motor is operating at its commanded motor speed. Hence, if the motor is operating at the speed that has been commanded, the spin error will be equal to zero.

After calculating the spin error (block 186) the routine advances to block 188 to inquire whether this spin error is positive or negative. If the spin error is negative, which means that the "previous revolution time" is less than the reference revolution time, it is concluded that the motor is operating too rapidly. Conversely, if the spin error is positive, due to the fact that the "previous revolution time" is greater than the reference revolution time, it is concluded that the motor is operating too slowly.

Let it be assumed that the spin error is negative. Accordingly, as shown in FIG. 7, the routine advances to block 190, whereupon the speed command signal is updated by adding this negative spin error to the reference speed command signal. Of course, since the spin error has been assumed to be negative, this arithmetical operation is, in effect, a subtracting operation. If the speed command signal is assumed to be a PWM signal, then the PWM off time is updated by adding the PWM reference duty cycle and the spin error. It is appreciated that this results in increasing the PWM off time which, in turn, decreases the PWM duty cycle, which is appropriate to compensate for excessive motor speed.

The routine then advances to block 192, which inquires whether the updated PWM off time (which has been increased) exceeds a maximum predetermined off time. If not, the routine advances to block 194. However, if the updated PWM off time exceeds the maximum predetermined off time, the actual updated PWM off time is limited to no more than 90% of the overall PWM period, as shown in block 196. Hence, excessive PWM off times are not permitted. Thereafter, the routine advances to block 194.

Assuming that the answer to the inquiry of block 188 indicates a positive spin error, representing that the motor is operating too slowly, the PWM off time is updated by summing the PWM reference duty cycle and the positive spin error value. This is represented by block 202. As a result, the PWM off time is reduced and the PWM duty cycle is increased. It is appreciated that this is an appropriate operation to compensate for insufficient motor speed.

Following the instructions carried out by block 202, the routine advances to block 204 to inquire whether the PWM off time is less than a minimum predetermined off time. Stated otherwise, inquiry is made to determine if the PWM duty cycle is too large. If the inquiry of block 204 is answered in the negative, the routine advances to block 194. However, if this inquiry is answered in the positive, that is, if the PWM off time would be less than the minimum predetermined off time if the positive spin error value merely is added to the PWM reference duty cycle, then the routine advances to block 206, whereupon the updated PWM off time is limited to no less than 10% of the overall PWM period. Stated otherwise, the PWM duty cycle is limited to a maximum of 90% in the event that the positive spin error is too large. As mentioned above, the PWM duty cycle is limited to no less than 10% in the event that a negative spin error is too large.

After updating the PWM duty cycle (or off time), or limiting the PWM duty cycle to no less than 10% and to no more than 90%, the routine advances to block 194, whereupon the just-measured index time is stored as the "old" index time. From block 182, it is appreciated that this stored "old" index time will be used in the next cycle through the motor control routine to be subtracted from the next measured index time in order to determine the "previous revolution time".

After carrying out the instruction of block 194, the routine advances to block 198 to inquire whether there are thirteen more spin errors in one direction than in the other. If this inquiry is answered in the affirmative, the PWM reference duty cycle (or off time) is changed by a predetermined amount, for example, by one microsecond, as represented by block 200. Thus, it is seen that the combination of blocks 198 and 200 is quite similar to the instructions represented by block 170 of FIGS. 6A–6B.

Of course, if the inquiry of block 198 is answered in the negative, the CPU merely exits from the motor control routine. This routine is carried out once again upon sensing the next index pulse.

From the foregoing description of the flow chart shown in FIG. 7, it will be appreciated that, during normal operation, the motor speed command signal is updated in response to each detected error, thereby compensating so-called "fast" or short term errors. However, in the event that "slow" or long term errors are detected, as when the number of spin errors in one direction exceeds the number of spin errors in the other by a predetermined amount (e.g. thirteen), the reference speed command signal itself is changed so as to compensate or correct for such "slow" errors. Examples of "slow" errors are motor drift due to temperature, changes in the operating characteristics of the components included in the motor drive circuit, changes in environmental conditions, wear and tear of the motor components or electrical circuitry, and the like. By changing the reference command signal (e.g. the reference PWM signal or the reference digital signal), such "slow" errors are compensated gradually while allowing "fast" errors to be corrected promptly, as is appropriate.

While the present invention has been particularly shown and described with reference to certain specific embodiments, it will be readily appreciated by those of ordinary skill in the art that various changes and modifications may be made. For example, it is contemplated that, rather than utilizing a CPU to generate a speed command signal, discrete circuitry capable of carrying out the functions described above may be adopted. It also is contemplated that changes in the motor drive circuitry may be effected, such as by utilizing other amplifying and/or switching devices to energize selected phases of the motor. In the embodiment shown in FIG. 2, transistor 64 may be omitted and the PWM motor speed command signal, if of sufficiently high repetition rate, may be applied directly to the gate electrodes of MOSFETS 30 and 32 without first being integrated. The current through the MOSFETS, and thus through the motor phase windings, may be "chopped". The duration that the "chopped" current flows through the windings, which is determined by the motor speed command signal, controls the motor speed. This modified embodiment effectively reduces power dissipation in the motor drive circuit.

Although an n-phase DC motor has been described (wherein n=2 or n=3), it is appreciated that a greater number of phases may be used. Also, an AC motor may be controlled in accordance with the teachings of the present invention with obvious, mechanical changes in the motor drive circuitry. Still further, various schemes of generating index pulses and commutation pulses have been described, but it is intended that the present invention not be limited solely to those specific schemes. Those of ordinary skill in the art will recognize other techniques for generating index pulses and commutation pulses. Still further, it is desirable that the brake circuit described above be used to rapidly dynamically brake the motor when the power supply (not shown in detail) is cut off. If desired, when carrying out the start up routine (FIGS. 6A-6B), an instruction to turn off the motor (block 144) may include an instruction whereby the power supply is cut off in response to CPU control. As a result, the turning off of the motor will result in its dynamic braking, as described above.

It is intended that the appended claims be interpreted as including the foregoing as well as other changes and modifications, and that the scope of the present invention not be limited solely by the specific embodiments described herein but should include other equivalent arrangements.

What is claimed is:

1. A method of driving an n-phase DC motor, where n>1, comprising the steps of operating a central processing unit (CPU) to generate a motor speed command signal in accordance with a predetermined programmed set of instructions; converting said motor speed command signal to a motor drive signal; selecting a respective phase of said DC motor to be energized; applying DC power to the selected phase as a function of said motor drive signal; supplying to said CPU signals representing the position or speed of said DC motor; operating said CPU to detect both rapidly changing and slowly changing errors in the actual speed of said DC motor; operating said CPU in accordance with a first set of instructions to modify said motor speed command signal by an amount tending to reduce rapidly changing detected speed errors; and operating said CPU in accordance with a second set of instructions to modify said motor speed command signal by an amount tending to reduce detected slowly changing speed errors.

2. The method of claim 1 wherein said step of supplying signals representing the position or speed of said DC motor comprises generating successive index pulses as said motor moves past predetermined index positions, the freuqency and time separation of said index pulses being a function of the speed of said motor, and supplying said index pulses to said CPU; and said step of operating said CPU to detect rapidly changing errors in the actual speed of said DC motor comprises determining from said index pulses an index time, storing a preceding index time, obtaining a difference time between the determined index time and the stored preceding index time, and calculating the DC motor speed error by subtracting a reference time value from the obtained difference time.

3. The method of claim 1 wherein said step of operating said CPU to modify said motor speed commmand signal to reduce slowly changing speed errors comprises combining a detected rapidly changing speed error with a reference speed value to produce the motor speed command signal; determining when the number of detected rapidly changing speed errors in one direction exceeds the number of detected rapidly changing speed errors in the opposite direction by a predetermined amount; and changing said reference speed value in a manner that reduces said detected rapidly changing speed errors in said one direction.

4. The method of claim 3 wherein said reference speed value is changed by a predetermined increment.

5. The method of claim 3, further including the step of limiting the value of the motor speed command signal produced by combining a detected rapidly changing speed error with a reference speed value to an amount greater than a predetermined minimum and less than a predetermined maximum.

6. The method of claim 1 wherein said motor speed command signal is a pulse width modulated (PWM) signal; and wherein said step of operating said CPU to modify said motor speed command signal comprises modifying the duty cycle of said PWM signal.

7. The method of claim 6 wherein said step of converting said motor speed command signal to a motor drive signal comprises integrating said PWM signal to produce a DC signal.

8. The method of claim 1 wherein said motor speed command signal is a digital signal having a value representing a commanded motor speed; said step of operating said CPU to modify said motor speed command signal comprises modifying the value of said digital signal; and said step of converting said motor speed command signal to a motor drive signal comprises converting said digital signal to a corresponding DC analog signal.

9. The method of claim 1 wherein said step of selecting a respective phase of said DC motor to be energized comprises generating n successive commutating pulses as said DC motor moves through n successive positions; and enabling a respective one of the n phases of said DC motor in accordance with said commutating pulses.

10. The method of claim 1 further comprising the steps of generating a signal representing the current actually flowing through the respective phases of said DC motor; negatively feeding back the last-mentioned generated signal to said motor drive signal to produce a difference signal representing the difference between the motor drive signal and said last-mentioned generated signal; and applying said difference signal to the selected phase.

11. The method of claim 10, further comprising the step of integrating said difference signal.

12. The method of claim 1 wherein said DC motor is a rotary motor; and wherein said step of operating a CPU to generate a motor speed command signal includes a start-up routine of sensing whether successive signals representing the rotary position or speed of said DC motor have been supplied to said CPU within a predetermined time period; sensing whether said DC motor has reached a predetermined speed within a preset number of revolutions thereof; sensing whether said DC motor has maintained said predetermined speed for a predetermined number of revolutions; and de-energizing said DC motor if any of the aforementioned occurrences have not been sensed.

13. The method of claim 12, further comprising the additional step of sensing if said DC motor has maintained said predetermined operating speed for a preset period of time and, if not, de-energizing said DC motor.

14. The method of claim 1 wherein $n=2$.

15. The method of claim 1 wherein $n=3$.

16. A method of driving an n-phase DC motor, where $n>1$, comprising the steps of operating a central processing unit (CPU) to generate a motor speed command signal in accordance with a predetermined programmed set of instructions; converting said motor speed command signal to a motor drive signal; selecting a respective phase of said DC motor to be energized; applying DC power to the selected phase as a function of said motor drive signal; supplying to said CPU signals representing the position or speed of said DC motor; operating said CPU to detect errors in the actual speed of said DC motor; operating said CPU to modify said motor speed command signal by an amount tending to reduce detected speed errors; and braking said DC motor when electrical power is interrupted, including storing a DC voltage level during the time period that power is applied, and using said stored DC voltage level to turn on phase selecting FET devices and shunt all of the n phases of said DC motor to a reference potential through said FET devices when said electrical power is interrupted.

17. Apparatus for controlling an n-phase DC motor comprising: a programmed central processing unit (CPU) for generating a motor speed command signal; converting means for converting said motor speed command signal to a motor drive signal; switch means responsive to said motor drive signal for switching DC power to a respective phase of said DC motor; index signal generating means for generating index signals as said DC motor operates and for supplying said index signals to said CPU; said CPU being programmed to respond to said index signals for detecting both rapidly changing and slowly changing errors in the actual speed of said DC motor; said CPU being programmed in accordance with a first set of instructions to modify said motor speed command signal by an amount that tends to reduce said radpily changing errors; and said CPU being programmed in accordance with a second set of instructions to modify said motor speed command signal by an amount that tends to reduce said slowly changing errors.

18. The apparatus of claim 17 further comprising means for supplying respective commutating pulses to said switch means to select a corresponding phase of said DC motor for energization, whereby DC power is switched through said switch means to the selected phase in accordance with the value of the motor drive signal.

19. The apparatus of claim 18 wherein said commutating pulses are derived from said CPU.

20. The apparatus of claim 17 further comprising means for sensing the current flowing in said respective phases of said DC motor and for producing a feedback signal representative thereof; difference means for producing a difference signal as a function of the difference between said motor drive signal and said feedback signal; and means for applying said difference signal to said switch means, whereby said switch means responds to said applied difference signal for switching DC power to a respective phase of said DC motor.

21. The apparatus of claim 20 wherein said means for applying said difference signal to said switch means comprises an integrator.

22. The apparatus of claim 17 wherein $n=2$.

23. The apparatus of claim 17 wherein $n=3$.

24. The apparatus of claim 17 wherein said CPU generates a pulse width modulated (PWM) speed command signal, and said converting means comprises integrator means for producing a DC level as a function of the duty cycle of said PWM speed command signal.

25. The apparatus of claim 17 wherein said CPU generates a digital speed command signal having a value representing a commanded motor speed, and said converting means comprises a digital-to-analog converter for producing a DC level as a function of the value of said digital speed command signal.

26. The apparatus of claim 17 wherein said CPU is programmed to detect rapidly changing errors in the actual speed of said DC motor by determining the time interval between index signals, storing a representation of a preceding time interval between index signals, obtaining the difference between the determined time interval, and the preceding time interval, and calculating the rapidly changing DC motor speed error by subtracting a reference time interval from said difference.

27. The apparatus of claim 26 wherein said CPU is programmed to modify said speed command signal to reduce said slowly changing errors by combining the calculated rapidly changing DC motor speed error with a representation of a reference value to produce the speed command signal, determining when the number of detected rapidly changing speed errors in one direction exceeds the number of detected rapidly changing speed errors in the opposite direction by a predetermined amount, and changing said representation of said reference speed value to reduce said detected rapidly changing speed errors in said one direction.

28. The apparatus of claim 27 wherein said representation of said reference speed value is changed by a predetermined increment.

29. The apparatus of claim 27 wherein said CPU is programmed to limit the speed command signal to an amount greater than a predetermined minimum value and less than a predetermined maximum value.

30. The apparatus of claim 17 wherein said DC motor is a rotary motor; and wherein said CPU is programmed to control said DC motor during an initial start-up mode by sensing whether successive index signals have been generated within a predetermined time, sensing whether said DC motor has reached a predetermined operating speed within a preset number of revolutions thereof, sensing whether said predetermined operating speed has been maintained for a predetermined number of revolutions, and terminating said motor speed command signal if any of the aforementioned occurrences has not been sensed.

31. The apparatus of claim 30 wherein said CPU is further programmed to sense during said initial start-up mode if said predetermined operating speed has been maintained for a preset period of time and, if not, to terminate said motor speed command signal.

32. Apparatus for controlling an n-phase DC motor comprising: a programmed central processing unit (CPU) for generating a motor speed command signal; converting means for converting said motor speed command signal to a motor drive signal; switch means responsive to said motor drive signal for switching DC power to a respective phase of said DC motor; index signal generating means for generating index signals as said DC motor operates and for supplying said index signal to said CPU; said CPU being programmed to respond to said index signals for detecting errors in the actual speed of said DC motor and to modify said motor speed command signal by an amount that tends to reduce said errors; means for supplying respective commutating pulses to said switch means to select a corresponding phase of said DC motor for energization, whereby DC power is switched through said switch means to the selected phase in accordance with the value of the motor drive signal; and wherein said switch means comprises n FET devices and a bipolar transistor, said FET devices being connected in common with said bipolar transistor, each FET device being connected to a respective phase of said DC motor and being rendered conductive by a respective commutating pulse, and said bipolar transistor being responsive to said motor drive signal to thereby determine the current that flows through the conductive FET device and a respective phase.

33. The apparatus of claim 32 further comprising energizable power supply means for supplying operating potential to said apparatus; storage means for storing a voltage when said power supply means is energized; and means responsive to the de-energization of said power supply means to apply said stored voltage to said n FET devices for rendering said n FET devices conductive and thereby short circuit the n phases of said DC motor to brake said motor.

* * * * *